(12) United States Patent
Rollender

(10) Patent No.: US 7,702,308 B2
(45) Date of Patent: Apr. 20, 2010

(54) METHOD OF ASSOCIATING DATA WITH A CALL TO A CALL CENTER

(75) Inventor: Douglas Harold Rollender, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 10/798,629

(22) Filed: Mar. 11, 2004

(65) Prior Publication Data

US 2005/0202799 A1    Sep. 15, 2005

(51) Int. Cl.
*H04M 3/42*   (2006.01)
(52) U.S. Cl. .................... 455/404.1; 455/415; 379/45
(58) Field of Classification Search ............. 455/404.1, 455/404.2, 403, 435.1, 521, 435.2, 435.3, 455/445, 527, 415, 414.1; 379/45, 32.05, 379/32.1, 33, 37, 38, 210, 111, 201.1
See application file for complete search history.

(56) References Cited

U.S. PATENT DOCUMENTS

| | | | | |
|---|---|---|---|---|
| 5,392,052 | A * | 2/1995 | Eberwine | 342/357.09 |
| 5,689,548 | A * | 11/1997 | Maupin et al. | 455/404.1 |
| 5,864,755 | A | 1/1999 | King et al. | 455/404 |
| 5,937,344 | A * | 8/1999 | Zicker | 455/404.1 |
| 5,949,865 | A * | 9/1999 | Fusinato | 379/221.09 |
| 6,038,437 | A * | 3/2000 | Zicker | 455/404.1 |
| 6,128,481 | A * | 10/2000 | Houde et al. | 455/404.2 |
| 6,556,816 | B1 * | 4/2003 | Gafrick et al. | 455/404.1 |
| 6,584,307 | B1 * | 6/2003 | Antonucci et al. | 455/422.1 |
| 6,766,159 | B2 * | 7/2004 | Lindholm | 455/404.1 |
| 7,103,153 | B2 * | 9/2006 | Stumer et al. | 379/45 |
| 7,155,201 | B2 * | 12/2006 | Lugo Saucedo et al. | 455/404.1 |
| 7,251,312 | B2 * | 7/2007 | D'Evelyn et al. | 379/45 |
| 7,302,250 | B2 * | 11/2007 | Chin et al. | 455/404.1 |
| 2004/0141607 | A1 | 7/2004 | Rollender | 379/210.1 |
| 2004/0203565 | A1 * | 10/2004 | Chin et al. | 455/404.1 |

(Continued)

FOREIGN PATENT DOCUMENTS

EP     1 124 394     8/2000

(Continued)

OTHER PUBLICATIONS

Dale N. Hatfield, "A Report on Technical' and Operational Issues Impacting the Provision of Wireless Enhanced 911 Services", URL:http://gullfoss2.fcc.gov/prod/ecfs/retrieve.cgi?native_or_pdf=pdf&id_document=6513296239, (Apr. 21, 2005), paragraph 2.2.4.

(Continued)

*Primary Examiner*—Cong Van Tran
(74) *Attorney, Agent, or Firm*—Harness, Dickey & Pierce

(57) ABSTRACT

A method of communication to at least one wireless unit originating an emergency call. The method includes the step of receiving at least one tag identifier in response to the emergency call originating from the at least one wireless unit. Once the tag identifier is received, a wireless call back number corresponding with the at least one tag identifier may be transmitted. A public service answering point emergency call register ("PSAP-ECR") may receive the at least one tag identifier and transmits the wireless call back number over a D interface.

11 Claims, 4 Drawing Sheets

U.S. PATENT DOCUMENTS

2004/0203573 A1   10/2004   Chin et al. ............... 455/404.1
2004/0242191 A1*  12/2004   Hossain et al. ........... 455/404.1
2005/0053209 A1*   3/2005   D'Evelyn et al. ........... 379/111

FOREIGN PATENT DOCUMENTS

EP           1124394 A1 *  8/2001

OTHER PUBLICATIONS

European Search Report.
"NENA Technical Information Document SS7 Guidelines for MSC to Selective Router Connectivity", NENA Technical Information Document, NENA-05-501, Oct. 16, 2002, Prepared by National Emergency Number Association (NENA) Technical Committee Chairs, Published by NENA, 422 Beecher Rd, Columbus, Ohio, 43230 USA—22 pages.
"Requirements for communication of citizens with authorities/organizations in case of distress (emergency call handling)", Draft ETSI SR 002 180, Vo.3.2 (Sep. 2003), ETSI, France, http://www.etsi.org—33 pages.
Pending U.S. Appl. No. 10/340,706, filed Jan. 13, 2003 (Chin 4-15).
Pending U.S. Appl. No. 10/617,697, filed Jul. 14, 2003 (Chin 8-21).
"NENA Technical Information Document (TID) On PSAP Call Back to All 9-1-1 Callers, Combating Wireles E911 Fraud And Mobile Emergency Service (E911M)", prepared by National Emergency Number Association (NENA), Mobile Emergency Service (E911M) Joint Working Group of the Wireless Technical Committee and the Network Technical Committee, Published by NENA, Mar. 22, 2005, pp. 1-51.

* cited by examiner

METHOD OF ASSOCIATING DATA WITH A CALL TO A CALL CENTER

BACKGROUND OF THE INVENTION

I. Field of the Invention

The present invention relates to telecommunications, and more particularly, to wireless communications.

II. Description of the Related Art

Emergency service calls in North America are originated by dialing "9-1-1." Other parts of the world may use some other abbreviated string of dialable digits, such as "6-1-1" in Mexico, for example. These abbreviated string of digits share the intent of simplify calling for help with an easy to remember number. These calls are routed to a local Public Service Answering Point Call Center ("PSAP-CC") to enable the initiation of an emergency response (e.g., police, fire department, road repair, and/or ambulance) while the caller is kept on the phone. If, however, the call is somehow disconnected or dropped before the emergency is completely reported or the responder arrives, the PSAP-CC may be required to call back the originator.

It should be noted that the record for a "9-1-1" call originated through a wired network may include Automatic Line Identification ("ALI") or the telephone number of the access line from which the call originated. The directory number ("DN") or telephone number of a wireless subscriber may not, however, be associated with a physical line or wireless unit. Instead, calls to a roaming wireless subscriber are routed to the wireless unit by way of the mobile station identification ("MSID"), as opposed to the mobile DN ("MDN"). Accordingly, performing an emergency call back to a wireless unit poses hurdles not encountered with landline devices, for example.

Typically, the MSID may be characterized as either a 10-digit mobile identification number ("MIN") or a 15-digit International Mobile Subscriber Identifier ("IMSI"). The IMSI may be programmed into a wireless unit or a Subscriber Identity Module ("SIM") card by the service provider with whom the wireless unit user has entered into a service agreement. Accordingly, the MSID may not necessarily be a dialable number.

The DN of a wireless unit is a dialable number. The DN is dialed by a caller and used to route a call through the network to the wireless subscriber's home system. At the subscriber's home system, the home location register ("HLR") contains the MSID associated with the subscriber's DN. The MSID, as opposed to the DN, may then be used to route the call through the network to the serving wireless system and page the subscriber. The subscriber's DN may be provided to the serving system from the SIM card through the wireless unit or by the home system to the serving system in a separate data file called the subscriber profile.

The rollout of systems employing a separate number for DN and MSID is a relatively recent occurrence for some wireless systems. Others have used this technique since their inception. Historically, the mobile identification number of a wireless unit was the same as the DN for some systems, particularly in systems supportive of TIA/EIA-41 standards, prior to implementing wireless number portability ("WNP") or thousands block number pooling ("TBNP") based on the Local Routing Number ("LRN") method and international roaming ("IR"). However, with WNP and TBNP, the MDN became "portable" or "poolable" from one service provider to another service provider. Since MSID may not be portable or poolable, the recipient service provider may assign a new MSID for a subscriber with a ported-in or pooled MDN.

International roaming has also forced the separation of MSID and MDN. While the MIN is a 10-digit number modeled after the North American Numbering Plan's 10-digit MDN, other nation's carriers using a different directory numbering plan may not allow their subscriber's DN to be equivalent to the internationally recognized MIN format. Another standard MSID is the IMSI. It may be used in TIA/EIA-41 and GSM systems around the world. IMSI is a 15-digit non-dialable number based on ITU-T Recommendation E.212, and therefore, may not serve as a 10-digit MDN.

Historically, when the MDN was the same as the MIN, the MIN would be delivered to a PSAP-CC and would be used as a call back number. With the separation of MIN and MDN as described above, it became necessary to deliver the MDN as a separate call back number to the PSAP-CC, as well as the caller's MSID. There are certain problems, however, associated with implementing this solution. One issue is that the serving system may not have the caller's MDN, only the MSID, to present to the PSAP-CC with the call. Some of the reasons for this relate to the way MSID-MDN separation has been implemented according to standards. Another reason is that the network interface used to deliver the call to the PSAP-CC may not have the capacity to signal both the DN and MSID or, in some cases, even a full DN.

An old serving TIA/EIA-41 system may not support WNP, TBNP or IR. This means that the older serving system may be expecting the MIN and the MDN to be the same. The older system would not even know to look for a separate MDN in the subscriber's service profile (e.g., keyed on MIN, not MDN). With this limitation, these subscribers may not be allowed to use basic services, but they must be allowed to call for emergency services. As a result, a roamer who dials "9-1-1" while on an old system will have his or her call delivered to the PSAP-CC with an MSID but no MDN. Accordingly, no call back is possible.

A newer serving system that is WNP and IR capable may not be able to deliver MDN to the PSAP-CC. This could happen if the calling wireless unit is not registered with any service provider (e.g., there are mobile phones used for emergency calls only). These wireless units may be referred to as non-subscriber initialized ("NSI") phones. It is also possible for a subscriber to place an emergency call before the HLR has responded to the serving system with the subscriber's service profile containing the DN. Even if the PSAP-CC has been provided with a working DN for callback, the callback to the DN will not go through if the subscriber has call forwarding service for all inbound calls or if the subscriber has a limited, pre-paid service and there is no remaining balance available to pay for the inbound callback from the PSAP-CC. Further, if the callback number is to a visiting international roamer, the PSAP-CC may need to place an international call. Some PSAP-CC may not have the ability to callback an international number. There is also the risk of network congestion or delay in completing an international call which would be detrimental to handling an emergency in a timely manner. Some PSAP-CCs may not even be equipped to place any outbound calls through separate, outbound administrative lines.

The call back DN for an international roamer would require the PSAP-CC to place an international call to reach a subscriber in their local Emergency Service Zone ("ESZ"). This is not a practical, timely or sufficiently reliable solution for a PSAP-CC that normally does not place international calls and for applications that may require immediate call back information for emergency purposes. In addition, the entire international MDN (up to 15 digits including a country code) may not be presented to the PSAP-CC for call back if the PSAP-CC only supports 10 digits.

It is also possible that the calling wireless unit is not registered with any service provider. As a result, there may be no DN associated with the wireless unit or no permanent MSID encoded in the wireless unit—such wireless units are referred to as NSI mobile phones, for example. This could be because (a) the NSI phone was never intended to be registered (there are such phones to use for emergency calls only), (b) the phone is new and has not yet been initialized by a service provider, (c) the subscription has expired and the NSI phone is no longer registered with a service provider or (d) the SIM card is lost, stolen, or simply never been inserted or been removed either advertently or inadvertently.

Some wireless units also support a removable User Identity Module ("R-UIM") or Subscriber Identity Module ("SIM") that may contain the MSID and the DN. If the R-UIM or SIM are not in the phone, then it can still be used to place an emergency call. However, there is no DN or MSID known to the phone or the serving system to provide the PSAP-CC as a call back number.

Every MS contains a unique mobile equipment identification number ("MEIN") encoded in the phone by the manufacturer. The MEIN may be, for example, an electronic serial number ("ESN"), as used in ANSI/TIA/EIA-41 systems or an International Mobile Equipment Identity ("IMEI") used in GSM systems. The MEIN is independent of the MSID and DN. The MEIN is signaled over the air between the wireless unit and the base station of a wireless system with a call origination attempt or soon thereafter. For example, if not supplied with the call origination attempt, the MEIN may be requested by the serving system.

Current standards for wireless emergency services call for delivering "9-1-1+the last seven digits of the MEIN" to the PSAP-CC as the form call back number when the directory number assigned to the wireless subscriber is not available. While this may serve to notify the PSAP-CC that no working callback number is available with the call, this "9-1-1+the last seven digits of the MEIN (MEIN7)" does not uniquely identify the call (i.e., many emergency calls may be identified by the same "9-1-1+MEIN7)" and is not routable through the network. This is attributable because to the "9-1-1+the last seven digits of the MEID" does not contain a complete MEID, and therefore is not unique.

While the hereinabove approach provides the PSAP-CC some measure for performing an emergency call back of a wireless unit, several hurdles still exist. For example, the callback number for a wireless unit in certain circumstances may be nothing more than a dummy number with user location data. Consequently, a need exists for a method and system architecture for ensuring the PSAP-CC receives a real call back number for a wireless unit originating a "9-1-1" call.

SUMMARY OF THE INVENTION

The present invention provides for a method and system architecture for ensuring a real callback number may be provided for a wireless unit originating a "9-1-1" call. More particularly, the present invention enables a call center, such as a local Public Service Answering Point Call Center ("PSAP-CC"), to initiate a callback, irrespective of whether the originating "9-1-1" caller was placed over wireless or wireline communications infrastructure, based on at least one tag identifier. For the purposes of the present disclosure, a tag identifier may correspond with a name or label to uniquely associate signaling from different sources such as, for example, the association of a voice with associated data transmitted over a different channel or in a separate message. Consequently, the tag identifier may include one or more reference keys to a database, such as an emergency call register or an emergency service message entity, for example. The tag identifier(s), therefore, may correspond with an emergency service routing key, a local public safety number, a paging identity and/or a mobile equipment identification number, for example.

In one embodiment of the present invention, a method of communication is provided to at least one wireless unit originating an emergency call. The method includes the step of receiving at least one tag identifier in response to the emergency call originating from the at least one wireless unit. Once the tag identifier is received, a wireless call back number corresponding with the at least one tag identifier may be transmitted. It should be noted that a public service answering point emergency call register may receive the tag identifier(s) and transmits the wireless call back number over a D interface.

In another embodiment of the present invention, a method is provided for establishing an emergency call originated by at least one wireless unit within a communication system having an emergency call register. The method may include transmitting at least one tag identifier from a mobile switching center associated with the at least one wireless unit over an $E_x$ interface, for example, in response to the emergency call from the at least one wireless unit. As in the previously detailed embodiment, the tag identifier(s) may include a reference key to the emergency call register. Moreover, the tag identifier(s) may correspond with at least one of an emergency service routing key, a local public safety number, a paging identity and a mobile equipment identification number. Thereafter, the transmitted tag identifier(s) may be entered into the emergency call register (e.g., a serving system emergency call register or a public service answering point emergency call register).

In yet another embodiment of the present invention, a method is provided for establishing an emergency callback originated by at least one wireless unit within a communication system having an emergency call register. The method may include transmitting at least one tag identifier from the emergency call register over a $B_e$ interface. The tag identifier may then be received and entered into a database, such as an emergency service message entity. Thereafter, the emergency callback corresponding with the entered tag identifier may be requested.

In still another embodiment of the present invention, a method is provided for establishing an emergency callback originated by at least one wireless unit within a communication system having an emergency service message entity. The method may include receiving at least one tag identifier from an emergency call register over a $B_e$ interface and entering the tag identifier(s) into the emergency service message entity. Subsequently, the emergency callback corresponding with the entered at least one entered tag identifier may be requested.

In still another embodiment of the present invention, a method is provided for establishing an emergency call originated by at least one wireless unit associated with a mobile switching center. The method includes transmitting at least one tag identifier from the mobile switching center associated with the wireless unit(s) to an emergency service entity in response to the emergency call from the at least one wireless unit. The method may include transmitting callback and location information associated with the wireless unit(s) from the emergency service message entity over a D interface, wherein the callback and location information correspond with the at least one tag identifier.

These and other embodiments will become apparent to those skilled in the art from the following detailed description read in conjunction with the appended claims and the drawings attached hereto.

BRIEF DESCRIPTION OF THE DRAWINGS

The present invention will be better understood from reading the following description of non-limiting embodiments, with reference to the attached drawings, wherein below.

It should be emphasized that the drawings of the instant application are not to scale but are merely schematic representations, and thus are not intended to portray the specific dimensions of the invention, which may be determined by skilled artisans through examination of the disclosure herein.

DETAILED DESCRIPTION

The present invention provides for a method and system architecture for ensuring a real callback number may be provided for a wireless unit originating a "9-1-1" call. More particularly, the present invention enables a call center, such as a local Public Service Answering Point Call Center ("PSAP-CC"), to initiate a callback, irrespective of whether the originating "9-1-1" caller was placed over wireless or wireline communications infrastructure, based on at least one tag identifier. For the purposes of the present disclosure, a tag identifier may correspond with a name or label to uniquely associate signaling from different sources such as, for example, the association of a voice. Consequently, the tag identifier may include one or more reference keys to a database, such as an emergency call register or an emergency service message entity, for example. The tag identifier(s), therefore, may correspond with an emergency service routing key, a local public safety number, a paging identity and/or a mobile equipment identification number, for example.

Figure 1:
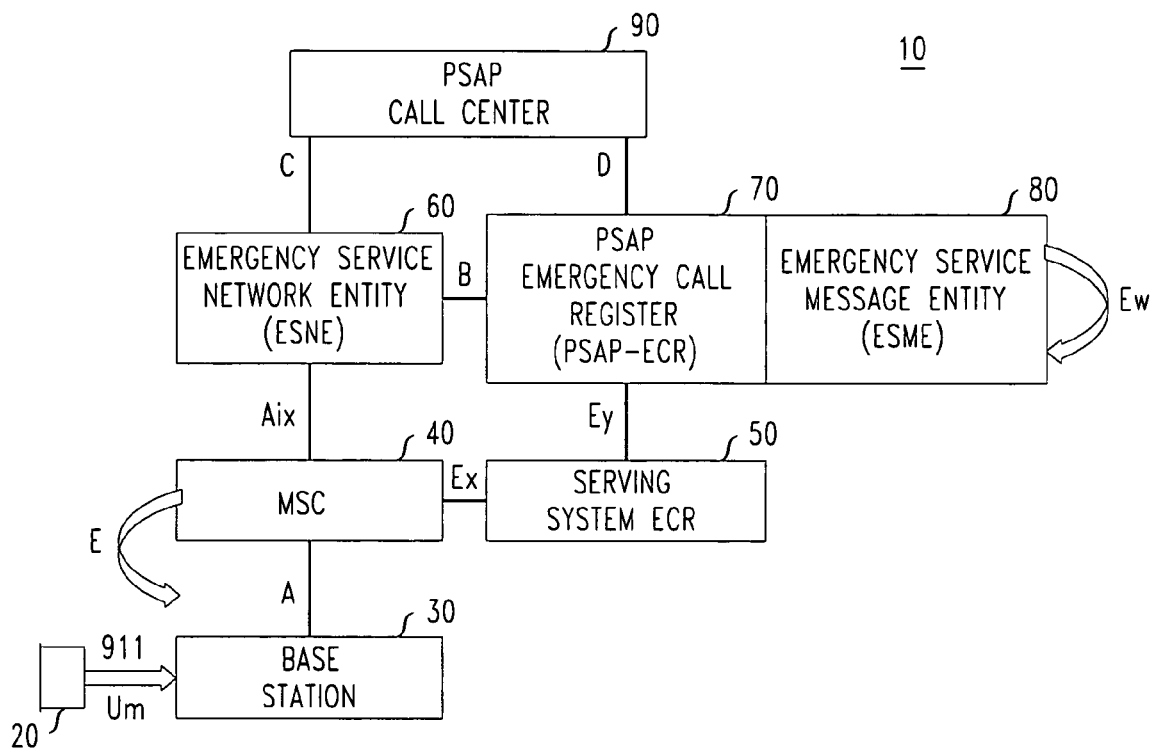
FIGS. 1 and 2 depicts an architecture and flow chart of one embodiment of the present invention.
Figure 2:
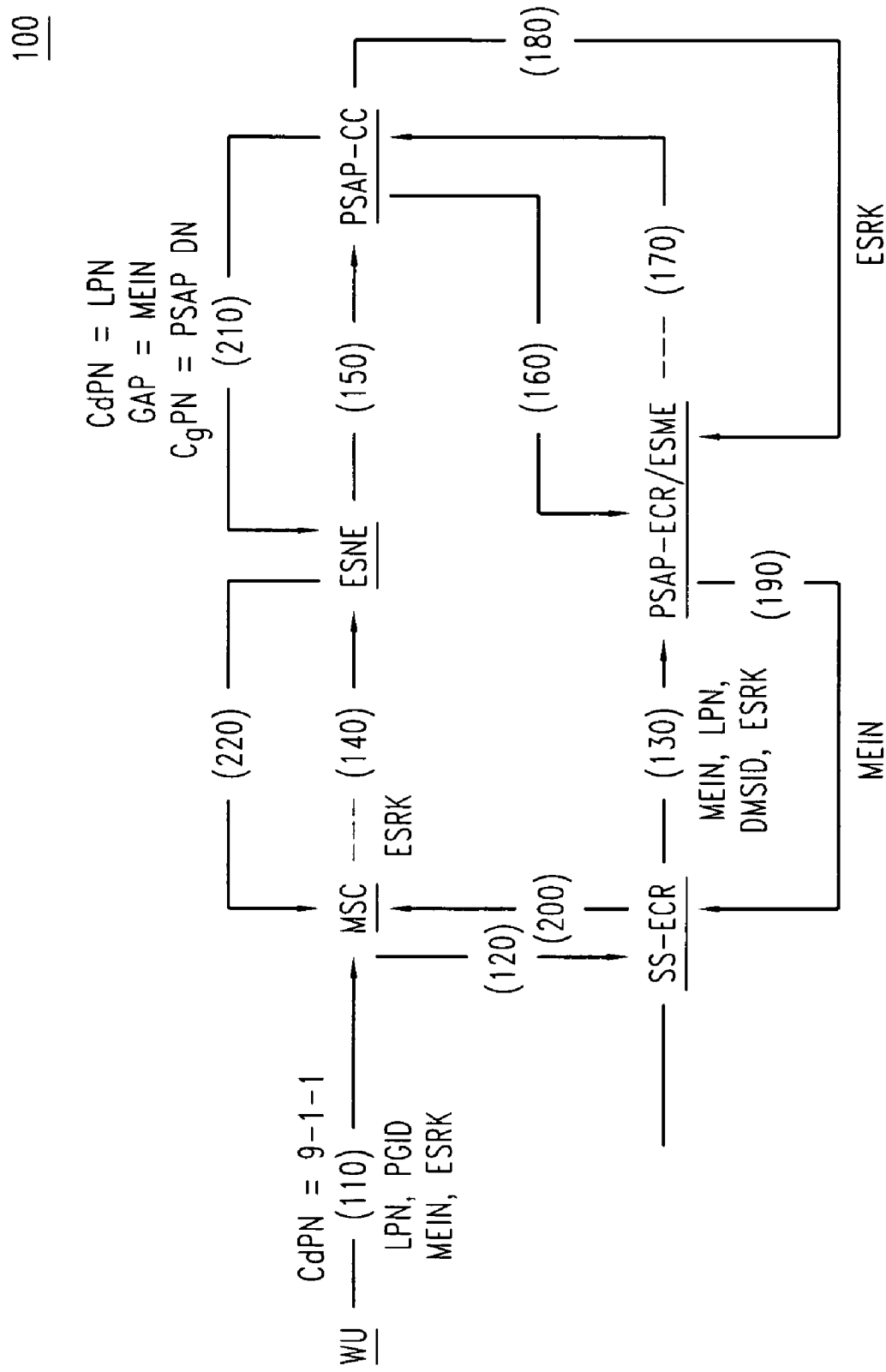

Referring to FIGS. 1 and 2, a set of embodiments of the present invention is illustrated. With respect to FIG. 1, an architecture 10 of a network reference model ("NRM") supporting mobile emergency service is shown, while FIG. 2 illustrates a message flow diagram 100 corresponding with the NRM of FIG. 1. More particularly, the embodiments of FIGS. 1 and 2 may be associated with a non-call associated signaling ("NCAS") technique for delivering a call to a call center over a designated interface without the data that may be necessary to handle the particular call over this designated interface.

As shown in FIG. 1, a wireless unit 20 is shown for communicating a "9-1-1" call to architecture 10. For the purposes of the present disclosure, a "9-1-1" call corresponds with an emergency call and/or a request for an emergency service(s) (e.g., police, fire department, road repair, and/or ambulance). The communication, as originated by wireless unit 20, is conveyed to a mobile switching center 40 ("MSC") through a base station 30 over an air interface, $U_m$. This step of communicating a "9-1-1" call to architecture 10 corresponds with message flow 110 in diagram 100 of FIG. 2.

Once the "9-1-1" call is received by MSC 40, identification information associated with wireless unit 20 may be communicated to an emergency call register at a serving system 50 ("ECR-SS"). This step of communicating information to ECR-SS 50 corresponds with the message flow 120 of FIG. 2. More particularly, the information associated with wireless unit 20 includes, for example, a mobile equipment identification number ("MEIN"). The transfer of the MEIN to ECR-SS 50 is performed by MSC 40 over a first NRM interface, $E_x$. It should be noted that the MEIN, as transferred to ECR-SS 50, might be realized by an International Mobile Equipment Identity ("IMEI"), electronic serial number ("ESN"), pseudo ESN ("pESN") and/or mobile equipment identity ("MEID").

Along with transferring the MEIN, MSC 40 may also communicate a paging identity ("PGID") to ECR-SS 50 as part of message flow 120. In the event that the "9-1-1" call from wireless unit 20 is dropped or disconnected from base station 30 and MSC 40, the PGID may be used to page wireless unit 20. To page wireless unit 20 in the circumstance of a call drop or disconnect, a local public safety number ("LPN") of MSC 40 may be needed to uniquely identify the switch serving "9-1-1" caller (e.g., wireless unit 20). The LPN may be a realized by a dialable number from a native or non-portable number block assigned to MSC 40. The LPN may assist in identifying ECR-SS 50 and for originating a call back to the "9-1-1" caller in the event of a call drop or disconnect within architecture 10.

In addition to the LPN, an Emergency Service Routing Key ("ESRK") may also be employed for uniquely identifying the "9-1-1" caller as part of message flow 120 of FIG. 2. The ESRK may support the communication of location information of wireless unit 20, as associated with the "9-1-1" call. The network elements and interfaces involved in providing an ESRK may be realized, in one embodiment, using existing communication standards.

From the hereinabove, the PGID may be one of a number of communication standards-based identifiers supporting paging wireless unit 20 to deliver an inbound call if the "9-1-1" call is dropped or disconnected. With respect to a GSM-based system, wireless unit 20 may be paged via an international mobile station identity ("IMSI") provided by wireless unit 20, a temporary mobile station identity ("TMSI") associated with the IMSI and/or an IMEI from wireless unit 20. In a CDMA2000 system, this paging step may be realized using a mobile identification number ("MIN"), an IMSI, a default mobile station identity ("dMSID") from a non-subscriber initiated ("NSI") wireless unit(s), an ESN from wireless unit 20 and/or a pESN generated from an MEID within wireless unit 20.

With identification information associated with wireless unit 20 received from MSC 40, SS-ECR 50 may then redirect this information over a network interface, $E_y$, to another emergency call register ("ECR") associated with a public service answering point 70 ("PSAP"). This activity corresponds with message flow 130 of FIG. 2. Consequently, the MEIN, LPN, dMSID and/or ESRK may be re-transmitted from SS-ECR 50 to ECR-PSAP 70. It should be noted that a PSAP-ECR database is shown as associated with an emergency service message entity 80 ("ESME"). Other associated databases in ESME 80, however, may be keyed on the ESRK, the MEIN, the mobile station identity (e.g., MIN or IMSI) and/or the directory number of the caller.

Thereafter, the ESRK may be signaled with the "9-1-1" call from MSC 40 to an emergency service network element 60 ("ESNE"). This transmission is performed over another network interface, $A_{ix}$. This activity corresponds with message flow 140 of FIG. 2.

Once delivered to ESNE 60, the ESRK is then re-transmitted to a public safety access point call center 90 ("PSAP-CC"). This further transmission of the ESRK may be performed over another network interface, C. This activity corresponds with message flow 150 of FIG. 2.

Subsequently, PSAP-CC 90 may use the ESRK to query ESME 80 about wireless unit 20 from which the "9-1-1" call originated. It should be noted that ESME 80 now should include the information previously redirected from interface $E_y$ to ECR-PSAP 70. This query of ESME 80 may be performed over another network interface, D. This activity corresponds with message flow 160 of FIG. 2.

In response to the query from PSAP-CC 90, ESME 80 may provide a callback number ("CBN"), as well as the cell site location and/or the wireless unit location, the LPN of the serving system and the MEIN of wireless unit 20 to PSAP-CC 90. This information may be directed to PSAP-CC 90 over the D interface. This activity corresponds with message flow 170 of FIG. 2. It should be noted that the CBN directed to PSAP-CC 90, in one embodiment of the present invention, may not be the directory number of the wireless unit or a non-dialable number as prescribed by exiting standards for NSI phones. In contrast, here, the callback number may consist of the LPN of MSC 40 serving wireless unit 20 and the MEIN of wireless unit 20.

With the CBN at its disposal, PSAP-CC 90 may further signal the PSAP-ECR 70 and ESME 80 over the D interface using the ESRK as a database key. This signaling step may be performed to request a callback through MSC 40 should the "9-1-1" originating call be dropped or disconnected. Callback through MSC 40 allows any PSAP-CC without the ability to immediately place an outbound call to use the D interface as an alternative to signal the PSAP-CC within the ESME to request MSC 40 to originate a new 9-1-1 call between the mobile phone and the PSAP-CC. Here, the request for a callback may be relayed through PSAP-ECR 70 to SS-ECR 50 over the $E_y$ interface. Thereafter, SS-ECR 50 may then request a callback through MSC 40 over the $E_x$ interface. This activity corresponds with message flows 180 through 200 of FIG. 2.

In alternative embodiment, an attendant in PSAP-CC 90 could use the LPN and/or MEIN to originate a callback directly to MSC 40 serving wireless unit 20 if PSAP-CC 90 were equipped with the appropriately lines and equipment. Here, the MEIN may be inserted in an ISDN user part ("ISUP") relating to global address parameter ("GAP"). It should be noted that PSAP-CC 90 might also use the ESRK to send a request ESME 80 over the D interface to demand ESNE 60. This demand may be intended to initiate a callback from PSAP-CC 90 to MSC 40 using the LPN and the MEIN. This activity corresponds with message flows 210 through 220 of FIG. 2.

It should be noted that the MEIN might identify wireless unit 20 for paging by MSC 40 to complete the callback. The directory number of PSAP-CC 90 may be contained in the calling party field of the call origination message. This number may be known by MSC 40 and checked in the calling party field to insure the caller may be authorized for emergency callback service.

Figure 3:
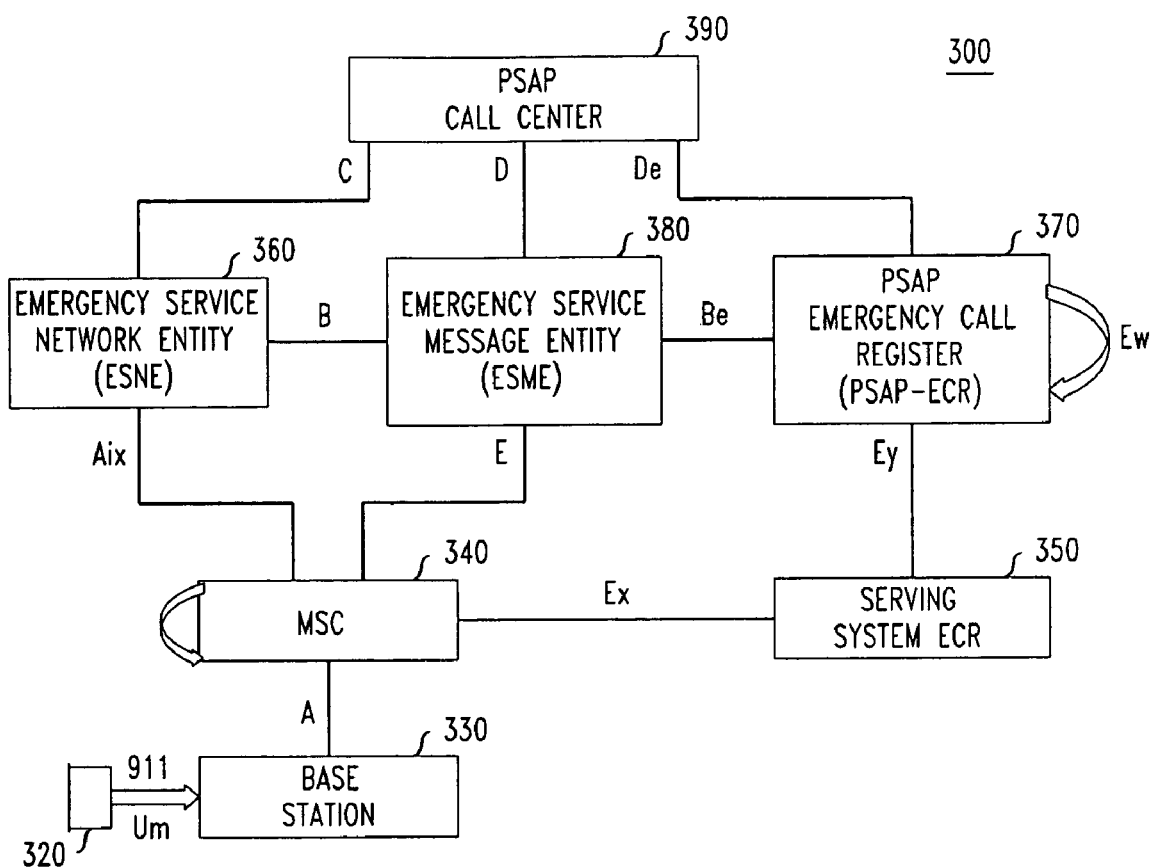
FIGS. 3 and 4 depicts an architecture and flow chart of another embodiment of the present invention.
Figure 4:
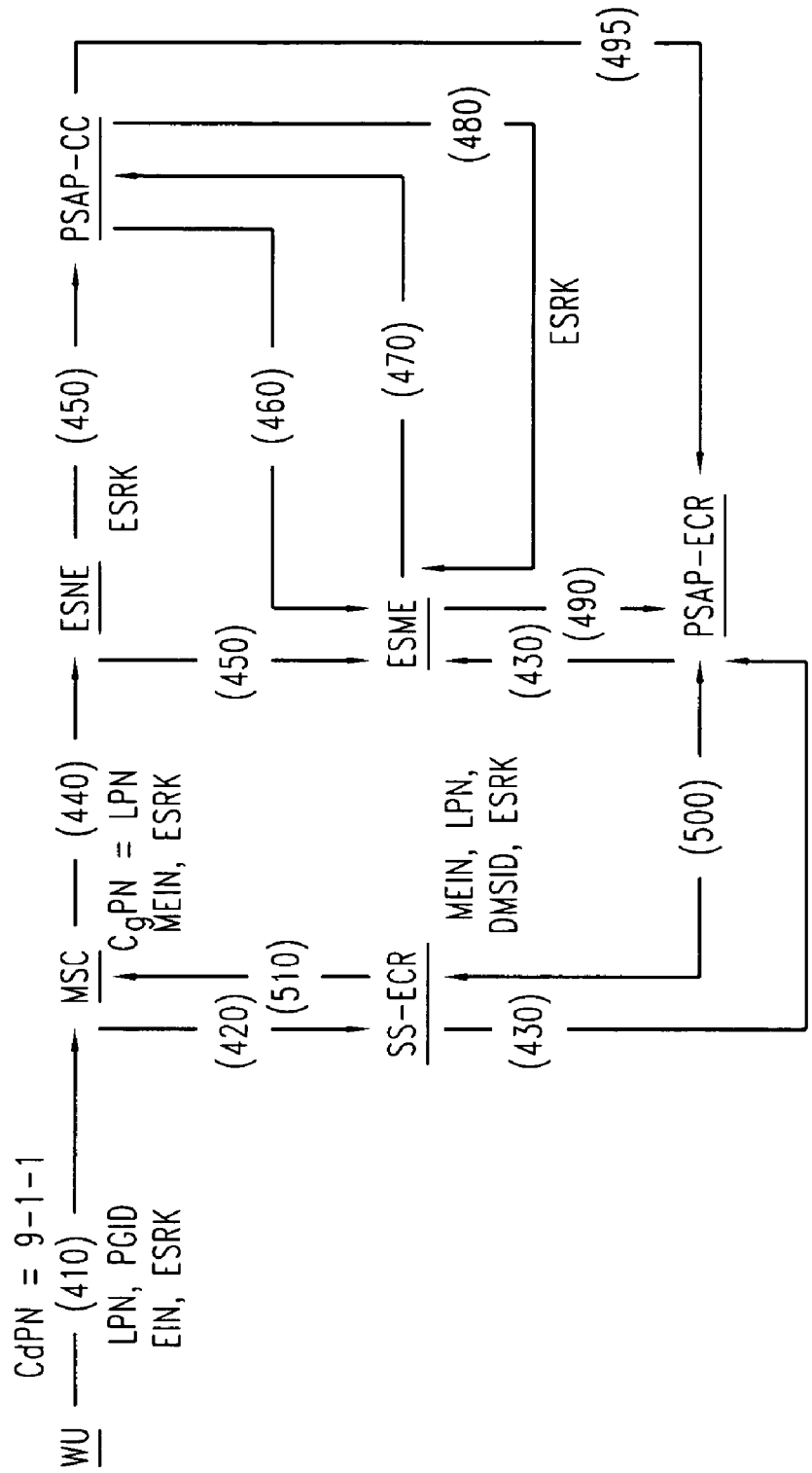

Referring to FIGS. 3 and 4, a set of another embodiments of the present invention is illustrated. With respect to FIG. 3, an architecture 300 of a network reference model ("NRM") supporting mobile emergency service is shown, while FIG. 4 illustrates a message flow diagram 400 corresponding with the NRM of FIG. 3. More particularly, the embodiment of FIGS. 3 and 4 may be associated with an alternative technique for establishing a call by a call center.

As shown in FIG. 3, a wireless unit 320 is shown for communicating a "9-1-1" call to architecture 300. The communication, as originated by wireless unit 320, is conveyed to an MSC 340 through a base station 330 over an air interface, $U_m$. This step of communicating a "9-1-1" call to architecture 300 corresponds with message flow 410 in diagram 400 of FIG. 4.

Once the "9-1-1" call is received by MSC 340, identification information associated with wireless unit 320 may be communicated to an ECR-SS 350. This step of communicating information to ECR-SS 350 corresponds with the message flow 420 of FIG. 4. More particularly, the information associated with wireless unit 320 includes, for example, a MEIN. The transfer of the MEIN to ECR-SS 350 is performed by MSC 340 over a first NRM interface, $E_x$. It should be noted that the MEIN, as transferred to ECR-SS 350, might be realized by an IMEI, ESN, pESN and/or MEID.

Along with transferring the MEIN, MSC 340 may also communicate a PGID to ECR-SS 350 as part of message flow 420. In the event that the "9-1-1" call from wireless unit 320 is dropped or disconnected from base station 330 and MSC 340, the PGID may be used to page wireless unit 320. To call wireless unit 320 in the circumstance of a call drop or disconnect, an LPN of MSC 340 may be needed to uniquely identify the particular switch or end office serving the "9-1-1" caller (e.g., wireless unit 320). The LPN may be a realized by a dialable number from a native or non-portable number block assigned to MSC 340. The LPN may assist in identifying ECR-SS 350 and for originating a call back to the "9-1-1" caller in the event of a call drop or disconnect within architecture 300.

In addition to the LPN, an ESRK may also be employed for uniquely identifying the "9-1-1" caller (e.g., wireless unit 320) as part of message flow 420 of FIG. 4. The ESRK may support the communication of location information of wireless unit 320, as associated with the "9-1-1" call. The network elements and interfaces involved in providing an ESRK may be realized, in one embodiment, using existing communication standards.

From the hereinabove, the PGID may be one of a number of communication standards-based identifiers supporting paging wireless unit 320 if the "9-1-1" call is dropped or disconnected. With respect to a GSM-based system, wireless unit 320 may be paged via an IMSI provided by wireless unit 320, a TMSI associated with the IMSI and/or an IMEI from wireless unit 320. In a CDMA2000 system, this paging step may be realized using a MIN, an IMSI, a dMSID from a NSI wireless unit(s), an ESN from wireless unit 320 and/or a pESN generated from an MEID within wireless unit 320.

In contrast with approach of the embodiments of FIGS. 1 and 2, architecture 300 and message flow diagram 400 depict a combination of call associated signaling ("CAS") and non-call associated signaling ("NCAS"). More particularly, the CAS technique may be associated with ESNE 360, while the NCAS method is associated with a PSAP-CC 390 based on separating a PSAP-ECR 370 from an ESME 380. Consequently, this technique may be termed a Hybrid CAS and NCAS for mobile emergency service.

Achitecture 300 employs a network interface $E_y$ between an SS-ECR 350 and PSAP-ECR 370. Furthermore, besides the addition of a network interface, E, between MSC 340 and ESME 380, network interface, B, may now be positioned between ESNE 360 and ESME 380 without PSAP-ECR 370. Consequently, a direct interface between ESNE 360 and PSAP-ECR 370 is not shown. Moreover, an additional network interface, $B_e$, has also been included between PSAP-ECR 370 and ESME 380. Network Interface D may now be positioned between ESME 380 and PSAP-CC 390. Finally, a separate additional network interface, $D_e$, has been incorporated between PSAP-ECR 370 and PSAP-CC 390.

With identification information associated with wireless unit 320 received from MSC 340, unlike the embodiments of FIGS. 1 and 2, SS-ECR 350 may communicate this information about the new emergency call over the Ey interface to PSAP-ECR 370. This activity corresponds with message flow 430 of FIG. 4. It should be noted that PSAP-ECR 370 is logically separated from ESME 380. Consequently, the LPN, MEIN and ESRK may also be communicated over the $B_e$ interface from PSAP-ECR 370 to ESME 380.

Thereafter, the ESRK may be communicated with the call (e.g., as call associated signaling) by MSC 340 over the $A_{ix}$ interface with the LPN and MEIN to ENSE 360. This activity corresponds with message flow 440 of FIG. 4. It should be noted that the ESRK may be sent over the C interface to the PSAP-CC 390 from ESNE 360, while the LPN and MEIN may be sent from ESNE 360 to ESME 380 over the B interface corresponding with message flow 450.

Once the ESRK has been communicated with the call and transmitted over the C interface, PSAP-CC 390 may use the ESRK to query ESME 380. This query is intended to provide PSAP-CC 390 with the callback number (i.e., the LPN and MEIN) associated with wireless unit 320. This activity corresponds with message flow 460 of FIG. 4.

Subsequently, ESME 380 may responds to PSAP-CC 390. More particularly, ESME 380 may provide the callback number, wireless unit location and other pertinent information needed to PSAP-CC 390 for handling the emergency call. This activity corresponds with message flow 470 of FIG. 4.

If the "9-1-1" call is dropped or disconnected, PSAP-CC 390 may use the ESRK to signal ESME 380 over the D interface. In so doing, a callback may be requested through MSC 340. This activity corresponds with message flow 480 of FIG. 4. Thereafter, ESME 380 may use the MEIN associated with the ESRK in its database to request a callback through MSC 340 from PSAP-ECR 370 corresponding with message flow 490. Alternatively, PSAP-ECR 370 may use the MEIN to signal PSAP-CC 390 may use the MEIN to signal PSAP-ECR 370 directly over the $D_e$ interface to request a callback through MSC 340 corresponding with message flow 495.

Subsequently, PSAP-ECR 370 may use the MEIN to request callback through MSC service. Here, the callback is made by MSC 340 with the request from PSAP-ECR 370 sent through the SS-ECR 350. This activity corresponds with message flow 500 of FIG. 4. Finally, SS-ECR 350 may provide MSC 340 with the PGID and request a callback through MSC 340 to wireless unit 320 and to PSAP-CC 390.

While the particular invention has been described with reference to illustrative embodiments, this description is not meant to be construed in a limiting sense. It is understood that although the present invention has been described, various modifications of the illustrative embodiments, as well as additional embodiments of the invention, will be apparent to one of ordinary skill in the art upon reference to this description without departing from the spirit of the invention, as recited in the claims appended hereto. Consequently, the method, system and portions thereof and of the described method and system may be implemented in different locations, such as the wireless unit, the base station, a base station controller and/or mobile switching center, for example. Moreover, processing circuitry required to implement and use the described system may be implemented in application specific integrated circuits, software-driven processing circuitry, firmware, programmable logic devices, hardware, discrete components or arrangements of the above components as would be understood by one of ordinary skill in the art with the benefit of this disclosure. Those skilled in the art will readily recognize that these and various other modifications, arrangements and methods can be made to the present invention without strictly following the exemplary applications illustrated and described herein and without departing from the spirit and scope of the present invention It is therefore contemplated that the appended claims will cover any such modifications or embodiments as fall within the true scope of the invention.

The invention claimed is:

1. A method of communication to at least one wireless unit originating an emergency call, the method comprising:

receiving, at an emergency service entity, a wireless call back number from a mobile station controller serving the at least one wireless unit, the wireless call back number being a local public safety number corresponding to at least one tag identifier;

receiving, at the emergency service entity, the at least one tag identifier from a public safety answering point call center in response to the emergency call from the at least one wireless unit, the at least one tag identifier being a reference key to the emergency service entity associated with the public safety answering point call center; and transmitting, from the emergency service entity, to the public safety answering point call center, the wireless call back number corresponding with the at least one tag identifier in response to receiving the at least one tag identifier.

2. The method of claim 1, wherein the at least one tag identifier corresponds with at least one of an emergency service routing key, a local public safety number, a paging identity and a mobile equipment identification number.

3. The method of claim 1, wherein a public service answering point emergency call register receives the at least one tag identifier and transmits the wireless call back number over a network interface between a public service answering point emergency call register and the public safety answering point call center.

4. The method of claim 1, wherein the step of transmitting a wireless call back number comprises: transmitting location information associated with the at least one wireless unit, the location information corresponding with the at least one tag identifier.

5. The method of claim 4, wherein an emergency service message entity transmits the location information associated with the at least one wireless unit.

6. A method of establishing an emergency callback originated by at least one wireless unit within a communication system having an emergency service message entity, the method comprising:

transmitting to the emergency service message entity a wireless call back number, the wireless call back number being a local public safety number corresponding to at least one tag identifier;

transmitting the at least one tag identifier to the emergency service message entity;

entering the at least one tag identifier into the emergency service message entity, the at least one tag identifier being a reference key to the emergency service message entity associated with the public safety answering point call center; and transmitting, from the emergency service message entity, the wireless call back number corresponding with the at least one tag identifier; and requesting the emergency callback corresponding with the entered at least one tag identifier.

7. The method of claim 6, wherein the at least one tag identifier corresponds with at least one of an emergency service routing key, a local public safety number, a paging identity and a mobile equipment identification number.

8. The method of claim 6, wherein the at least one tag identifier is transmitted to the emergency service message entity over a network interface between the emergency service message entity and a public service answering point emergency call register.

9. A method of establishing an emergency call originated by at least one wireless unit within a communication system having an emergency service message entity, the method comprising:

receiving a wireless call back number at the emergency service message entity, the wireless call back number being a local public safety number corresponding to at least one tag identifier;

receiving the at least one tag identifier at the emergency service messaging entity;

entering the at least one tag identifier into the emergency service message entity, the at least one tag identifier being a reference key to the emergency service message entity associated with the public safety answering point call center; and transmitting, from the emergency service message entity, the wireless call back number corresponding with the at least one tag identifier; and requesting the emergency call corresponding with the entered at least one entered tag identifier.

10. The method of claim 9, wherein the at least one tag identifier corresponds with at least one of an emergency service routing key, a local public safety number, a paging identity and a mobile equipment identification number.

11. The method of claim 9, wherein the at least one tag identifier is transmitted from the emergency call register to the emergency service message entity over a network interface between the emergency service message entity and a public service answering point emergency call register.

* * * * *